United States Patent [19]

Toyoda

[11] 3,899,788
[45] Aug. 12, 1975

[54] LIGHT METERING SYSTEMS AND EXPOSURE CONTROL SYSTEMS FOR CAMERAS

[75] Inventor: Kenji Toyoda, Tokyo, Japan

[73] Assignee: Nippon Kogaku K.K., Tokyo, Japan

[22] Filed: Apr. 5, 1974

[21] Appl. No.: 458,413

[30] Foreign Application Priority Data
Apr. 12, 1973 Japan.................. 48-40852

[52] U.S. Cl. .............. 354/23 D; 354/51; 354/60 L; 356/226
[51] Int. Cl. ...... G03b 7/08; G01j 1/46; G03b 17/18
[58] Field of Search.......... 354/24, 50, 51, 60, 60 L, 354/23 D; 356/226

[56] References Cited
UNITED STATES PATENTS
3,603,799 9/1971 Nobujava......................... 354/60 X
3,703,130 11/1972 Watanabe............................ 354/24
3,748,979 7/1973 Wada................................... 354/50
3,800,305 3/1974 Ogigo et al......................... 354/60 L
3,824,608 7/1974 Toyoda............................... 354/60
3,827,065 7/1974 Wada................................... 354/51

*Primary Examiner*—Joseph F. Peters, Jr.
*Attorney, Agent, or Firm*—Shapiro and Shapiro

[57] ABSTRACT

Light metering systems employ a reversible binary counter which is automatically incremented or decremented in response to variations in the intensity of light of the object to be photographed so that the count number in the counter continuously represents an exposure factor, such as the shutter speed, which can be displayed by digital indicator elements. The light metering systems may control exposure adjusting members, such as electric shutters, for forming automatic exposure control systems for cameras.

23 Claims, 6 Drawing Figures

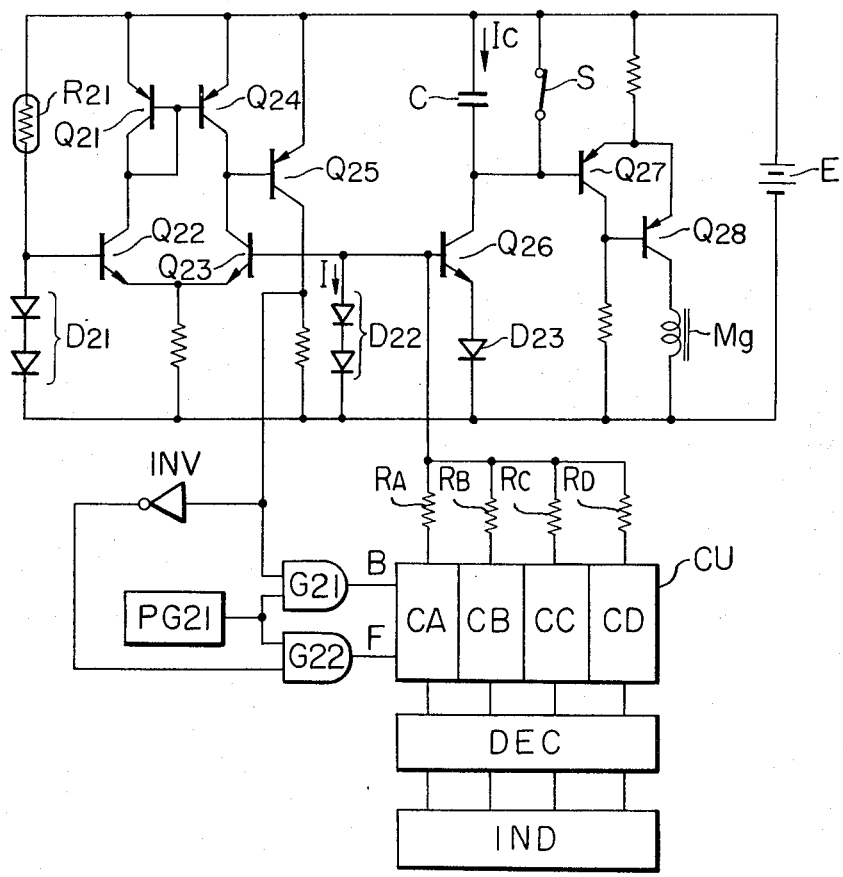

LIGHT METERING SYSTEMS AND EXPOSURE CONTROL SYSTEMS FOR CAMERAS

BACKGROUND OF THE INVENTION

This invention relates to improved light metering systems in which an analog signal representing the brightness of an object to be photographed is converted into a corresponding digital signal which may be displayed by digital indicator elements, and is more particularly directed to automatic exposure control systems employing such light metering systems.

DESCRIPTION OF THE PRIOR ART

Light metering systems in cameras equipped with devices for indicating exposure factors to be controlled, such as the shutter speed, have heretofore employed ammeters for providing the photographer with an indication of the exposure factor in advance of picture-taking. However, such ammeters are easily damaged by mechanical impacts and must be relatively large to exhibit good response characteristics.

In an effort to overcome these disadvantages, and also to provide improved reliability and a better visual display, it has been proposed to use light-emitting diodes, liquid crystals or other digital indicator elements as the exposure factor indicators. Two methods of introducing such digital indicator elements into the metering system of a camera have been proposed.

In the first method, an analog signal representing the intensity of light and other factors is applied as a common input to a plurality of Schmitt trigger circuits having different threshold voltages, the conditions of the Schmitt trigger circuits being indicated by the aforesaid digital indicator elements.

In the second method, pulses generated by a pulse generator are counted by a counter circuit and an analog signal corresponding to the number of pulses counted is compared with an analog signal representative of the light intensity and other factors. When the two analog signals assume a predetermined relationship, counting is interrupted and the number of pulses counted is indicated by digital indicator elements.

Both methods have disadvantages. In the first method, the input terminals of the Schmitt trigger circuits must be connected at a single point which is connected to the signal source. This produces a low input impedance to the Schmitt trigger circuits, which may cause errors in transmission of the signals. Furthermore, the hysteresis characteristics of the Schmitt trigger circuits limit the degree of the accuracy of the indicated value. A further disadvantage of this method is that the threshold levels of the Schmitt trigger circuits require fine adjustment.

In the second method, for enabling the counter to follow a continuously varying analog signal representing variations in the object brightness and other factors, it has been necessary to periodically reset the counter circuit and repeat the counting operation after each resetting. Thus, the response speed of the indication is limited by the period of the reset pulse and, in addition, the repetition of the counting causes the indicator device to flicker, which detracts from comfortable viewing.

SUMMARY OF THE INVENTION

It is an object of the present invention to provide light metering systems in which the disadvantages noted above are eliminated and to provide improved automatic exposure control systems employing such metering systems for use in cameras having electric shutters and the like.

Briefly stated, a metering system of the present invention comprises a photoelectric converter circuit for generating a first analog signal which is representative of the brightness of an object to be photographed, a reversible pulse counter, a D-A converter circuit for producing a second analog signal which is representative of the count number in the reversible counter, and a counter control circuit for stepping the counter in a first direction when the second analog signal is greater than the first analog signal and for stepping the counter in the opposite direction when the second analog signal is less than the first analog signal.

The metering systems of the present invention can be employed with an exposure adjusting member, such as an electric shutter, for providing automatic exposure control systems.

BRIEF DESCRIPTION OF THE DRAWINGS

The invention will be further described in conjunction with the accompanying drawings, which illustrate preferred and exemplary embodiments, and wherein:

FIG. 3 is a chart illustrating the operating conditions of the indicator elements of FIG. 2; and FIGS. 4 – 6 show other exposure control systems which employ still other light metering systems in accordance with the invention.

DESCRIPTION OF THE PREFERRED EMBODIMENTS

The light metering systems of the invention will be described in detail with reference to the following embodiments, wherein, for the purpose of illustration, the light metering systems are employed with electric shutter control circuits for providing automatic exposure control systems for TTL cameras.

Figure 1:
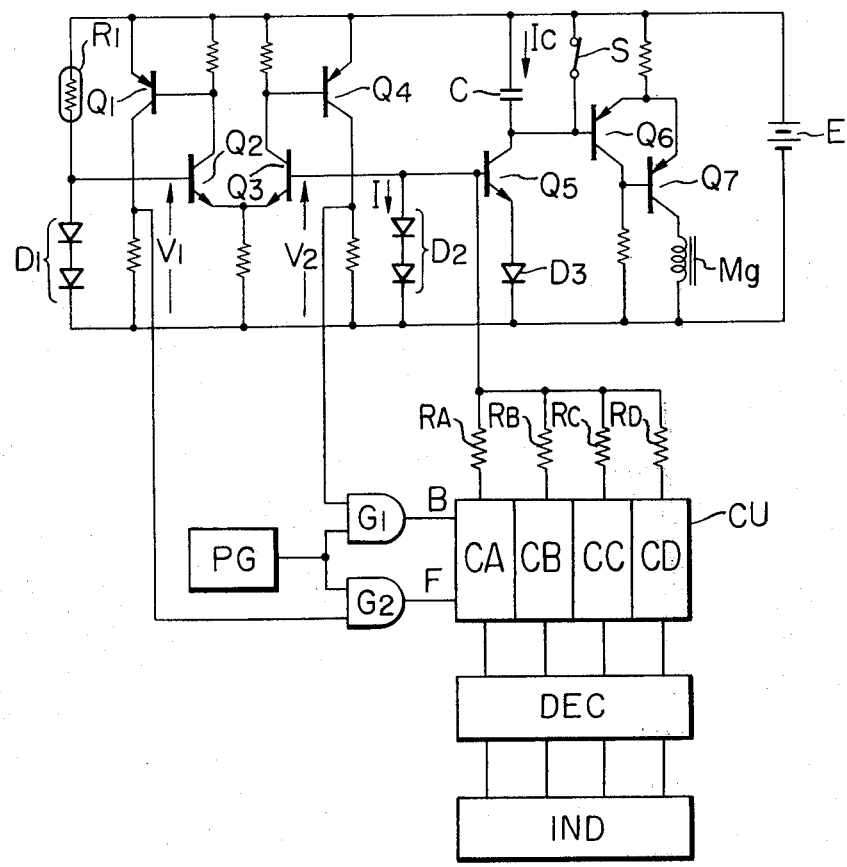
FIG. 1 is a circuit diagram, partly in schematic and partly in block form, showing an automatic exposure control system employing a light metering system in accordance with the invention.

In the first embodiment, shown in FIG. 1, letter E designates a power source of voltage E and R1 designates a photoconductive element, such as CdS cell or the like. The element R1 receives the viewing field light and varies its own resistance value in accordance with the brightness of an object to be photographed. A diode D1 and the photoconductive element R1 are connected in series with the power source E. Such a circuit arrangement, as is well known, provides a photoelectric converter circuit for generating an analog signal corresponding to the brightness of the object, the voltage $V_1$ at the junction of diode D1 and element R1 being proportional to the logarithm of the object brightness B. Thus, $$V_1 = K_1 \log B + K_2 \qquad (1),$$

where $K_1$ and $K_2$ are constants.

A pulse generator PG generates pulses at a predetermined frequency which are applied to a reversible, binary counter CU through AND gate circuits G1 and G2. The binary reversible counter CU has two input terminals B and F. When pulses are applied to input terminal F, the count number stored in the counter is incremented by each incoming pulse (i.e., the counter counts in the positive direction by adding the number of new incoming pulses to the count number stored in the counter CU). Conversely, when pulses are applied to input terminal B, the count number is decremented by each incoming pulse (i.e., the counter CU counts in the negative direction by subtracting the number of new incoming pulses from the count number).

The counting stages of the reversible counter CU comprise flip-flops CA, CB, CC and CD. One output of each flip-flop is applied through a decoder DEC to an indicator IND, which may comprise electric lamps, light-emitting diodes, liquid crystals, or the like, for indicating the count number stored in the reversible counter. The other outputs of the flip-flops are connected through respective weighted resistors $R_A$, $R_B$, $R_C$ and $R_D$ to a diode D2 so that each resistor conducts current whenever its corresponding flip-flop is in the state wherein the output connected to that resistor is at a high level. These connections provide a D-A converter circuit for converting the count number stored in the reversible counter into an analog signal representing the count number. If the resistance values of the weighted resistors are selected to satisfy the relation that $R_A = 2R_B = 4R_C = 8R_D$, then the current I flowing through the diode D2 will be proportional to the count number $n$, as is well known.

Accordingly, the voltage $V_2$ across diode D2 may be expressed as:

$$V_2 = K_3 \log n + K_4 \qquad (2),$$

where $K_3$ and $K_4$ are constants.

Transistors Q1, Q2, Q3 and Q4 provide a comparator circuit comprising a differential amplifier having two input terminals connected respectively to the junction of photoconductive element R1 and diode D1 and to the junction of weighted resistors $R_A$, $R_B$, $R_C$, $R_D$ and diode D2. The comparator circuit compares the voltages $V_1$ and $V_2$ of the respective analog signals and produces two output signals representing the relative magnitudes of those voltages at respective output terminals, which are connected to the AND gates G1 and G2, respectively. The circuit is designed so that both output signals are at a high level H when voltage $V_2$ equals voltage $V_1$.

The circuitry described above constitutes the light metering circuitry of the exposure control system of FIG. 1. The exposure control circuitry, shown in the preferred form as a shutter control circuit, is described hereinafter.

A transistor Q5 and a diode D3 are provided to constitute a so-called logarithmic expansion circuit, which is responsive to the voltage $V_2$ across diode D2 to produce a collector current $I_C$ which is equal to the current I flowing through the diode D2. A capacitor C is connected to the collector of the transistor Q5 and is adapted to be charged with the collector current $I_C$ thereof. A switch S for controlling charging of capacitor C is normally closed but is opened upon opening of the camera shutter (not shown). Transistors Q6 and Q7 together constitute a Schmitt trigger circuit for energizing an electromagnet Mg in accordance with the voltage across capacitor C. When energized, electromagnet Mg prevents the shutter from closing, and when de-energized, it permits the shutter to close.

Power for the pulse generator PG, AND gates G1 and G2, the reversible counter CU, the decoder DEC and the indicator IND is provided by power source E.

Operation of the embodiment of FIG. 1 will now be described. Switch S is normally closed for short-circuiting capacitor C so that transistor Q6 is non-conducting and transistor Q7 is conducting. Electromagnet Mg is therefore energized so that the shutter, after being opened by actuation of the shutter release mechanism (not shown), will be prevented from closing until the electromagnet is de-energized.

For convenience of description, it will be assumed that the count number stored in the reversible counter CU is initially zero. Therefore, no current flows through the diode D2 and the voltage $V_2$ is zero. On the other hand, there is a voltage $V_1$ produced across diode D1, as shown by equation (1). Because voltage $V_2$ is less than voltage $V_1$, transistors Q2 and Q1 in the comparator circuit are conducting, while the transistors Q3 and Q4 are non-conducting. Consequently, the collector voltage of the transistor Q1 is at a high level H and the collector voltage of the transistor Q4 is at a low level L. AND gate G2, which is connected to transistor Q1, is therefore open and the other AND gate G1 is closed.

As a result, the next pulses generated by pulse generator PG are applied through AND gate G2 to input terminal F of the reversible counter CU for stepping the counter in the positive direction. As the count number is thereby increased, the current I flowing through the diode D2 increases and voltage $V_2$ increases. When the voltage $V_2$ rises to a level equal to the voltage $V_1$, the transistors Q3 and Q4 conduct, opening AND gate G1 and thereby permitting subsequently generated pulses to also be applied to the input terminal B of the counter. Thus, the pulses are now applied simultaneously to both input terminals B and F of the counter CU, with a result that the counter ceases counting. If the object brightness thereafter decreases, causing the voltage $V_1$ to decrease to a value less than voltage $V_2$, transistors Q1 and Q2 become non-conductive and transistors Q3 and Q4 remain conductive, thereby holding AND gate G1 open and closing AND gate G2. The next pulses from pulse generator PG are therefore applied only to input terminal B of the counter for stepping the counter in the negative direction. The pulse counter continues counting in this direction until the voltage $V_2$ equals voltage $V_1$.

Thus, whenever the voltage difference $(V_2 - V_1)$ between input voltages $V_1$ and $V_2$ of the comparator circuit is greater than zero (i.e., positive), the pulses from the pulse generator PG are applied only to input terminal B of the reversible counter CU for stepping the counter in the negative (i.e., backward) direction. Conversely, whenever the voltage difference $(V_2 - V_1)$ is less than zero (i.e., negative), the pulses are applied only to input terminal F of the counter for stepping the counter in the positive (i.e., forward) direction.

The count number $n$ which is stored in the counter when the difference $(V_2 - V_1)$ equals zero can be calculated by setting $V_1$ equal to $V_2$ in equations (1) and (2), which yields the following relationship:

$$K_1 \log B - K_3 \log n = K_4 - K_2 \quad (3)$$

If the circuit constants are determined so as to satisfy the relation $K_1 = K_3$, then $$\log \frac{B}{n} = \frac{K_4 - K_2}{K_1},$$

or $$\frac{B}{n} = K_5 \quad (4),$$

where $$K_5 = \exp\left(\frac{K_4 - K_2}{K_1}\right).$$

Thus, the count number $n$ is inversely proportional to the object brightness B. If such count number $n$ is indicated by the indicator IND through the decoder DEC, there is provided an indication of an exposure factor, such as the shutter speed.

Description will now be made of the manner in which shutter speed is automatically controlled in accordance with the count number n.

The shutter opening mechanism (not shown) of the camera is actuated in known manner for photographing an object having brightness B. At the point in time when the shutter (not shown) opens to expose the film in the camera, switch S is opened for causing collector current $I_C$ of transistor Q5 to commence charging capacitor C. At this time, transistors Q6 and Q7 of the Schmitt trigger circuit are in the non-conducting and conducting states, respectively, so that electromagnet Mg is energized for holding the shutter open. When the voltage across the capacitor reaches the threshold voltage of the Schmitt trigger circuit, transistor Q6 becomes conducting and transistor Q7 becomes non-conducting, thereby cutting off the current supply to electomagnet Mg for permitting the shutter to close. The time required for capacitor C to be charged to the switching or threshold voltage of the Schmitt trigger is the exposure time. As noted previously, the collector current $I_C$ of the transistor Q5 is equal to the current I flowing through the diode D2. This current I is proportional to the count number $n$, which in turn is proportional to the object brightness B, as shown by equation (4). The time required to charge capacitor C to the threshold voltage is inversely proportional to the charging current $I_C$ and, as a result, the exposure time is inversely proportional to the object brightness B. Thus, the exposure time, (i.e., shutter speed) is automatically controlled to provide proper film exposure in spite of variations in the brightness of the object to be photographed.

With the above-described construction, the count number stored in the reversible counter is changed only when there is a difference between voltages $V_1$ and $V_2$, which may occur as a result of variations in the object brightness, and the count number is changed only to the extent required to make voltage $V_2$ equal to voltage $V_1$. This provides a light metering system having greatly improved response speed as compared with conventional systems in which a counter is periodically reset to zero.

Figure 2:
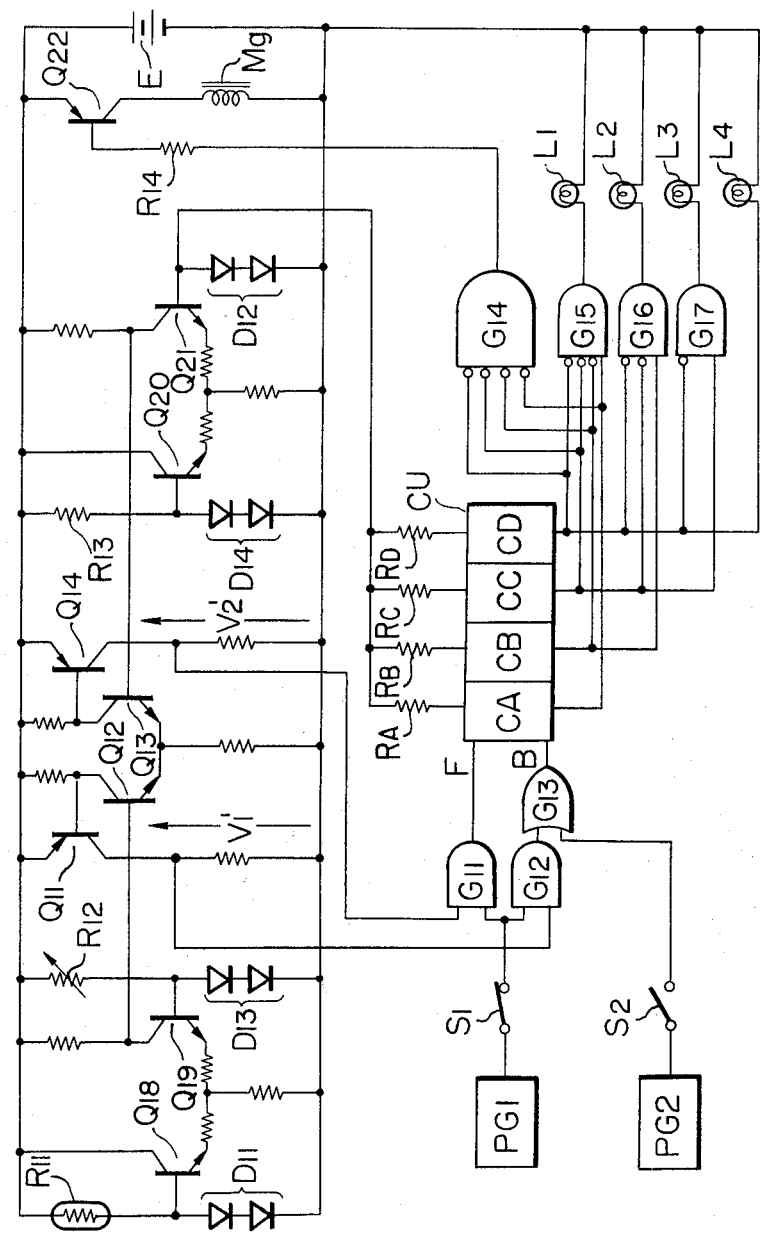
FIG. 2 shows an exposure control system employing another light metering system in accordance with the invention.

FIG. 2 shows another embodiment of a light metering circuit of the invention employed in an automatic exposure control system which can be used effectively in so-called TTL (through the lens) cameras, in which a photoconductive element such as CdS cell or the like disposed in the optical path of the camera behind the photographic lens is removed from the optical path just prior to opening of the shutter. Accordingly, this system is provided with a storage circuit for temporarily storing a signal which represents the object brightness.

R11 is a photoelectric element such as CdS cell or the like which is disposed behind the photographic lens in a single-lens reflex camera or the like for receiving the viewing field light which passes through the lens. A diode D11 is connected in series with a power source E and with the photoconductive element R11. R12 is a variable resistor, the resistance value of which is adjusted in accordance with the aperture setting of the lens and the sensitivity of the film used. A diode D13 is connected in series with the variable resistor R12.

Diodes D11 and D13, photoconductive element R11 and variable resistor R12 together constitute a bridge circuit between the positive and negative terminals of power source E. The output terminals of the bridge circuit, that is, the junction of R11 and D11 and the junction of R12 and D13, are connected to respective input terminals of a first differential amplifier circuit provided by transistors Q18 and Q19.

The circuitry just described constitutes a photoelectric converter circuit for producing an analog signal corresponding to the brightness of an object. By suitably selecting the value of the variable resistor R12, the output voltage $V_1$ of the first differential amplifier circuit may be described as follows:

$$V_1' = K_6 \log \frac{BS}{A^2} + K_7 \quad (5),$$

where B is the object brightness, S is the ASA sensitivity of the film, A is the F-number of the lens, and $K_6$ and $K_7$ are constants.

A first pulse generator PG1 generates pulses at a predetermined frequency which are applied to a reversible counter CU through a switch S1, AND gates G11 and G12, and an OR gate G13. Switch S1, which is normally closed, is adapted to be opened immediately before a mirror, for example, is moved up by a mirror drive member of a single-lens reflex camera to a position in which the mirror intercepts the viewing field light which was incident on the photoconductive element R11.

Reversible counter CU is a binary counter similar to the reversible counter CU in the first embodiment and has binary counting stages comprising flip-flops CA, CB, CC and CD. A second pulse generator PG2 is provided for generating pulses at a predetermined frequency.

A switch S2, which is adapted to apply pulses from pulse generator PG2 to OR gate G13, operates in the same manner as switch S in the system of FIG. 1, that is, the switch is normally open and is adapted to be closed in response to the opening operation of the camera shutter. Thus, when the shutter opens (i.e., when exposure of the film begins), the pulses generated by pulse generator PG2 are applied through OR gate G13 to the input terminal B of the reversible counter CU. One output terminal of each of flip-flops CA, CB, CC and CD of the reversible counter is connected to a diode D12 through respective weighted resistors $R_A$, $R_B$, $R_C$ and $R_D$, respectively. The junction of the resistors and diode D12 provides one input of a second differential amplifier circuit provided by transistors Q20 and Q21. The other input of the second differential amplifier circuit is connected to the junction of a fixed resistor R13 and a diode D14. The differential amplifier then provides a D-A converter circuit for producing an analog signal representing the count number $n$ stored in the counter CU. That is, the current flowing through the diode D12 is proportional to the count number $n$ stored in the reversible counter. The output $V_2'$ of the second differential amplifier circuit is opposite in phase to the voltage across diode D12 and may be expressed as:

$$V_2' = -K_8 \log n + K_9 \qquad (6),$$

where $K_8$ and $K_9$ are constants.

The output $V_2'$ of the second differential amplifier circuit and the output $V_1'$ of the first differential amplifier circuit are compared in a comparator circuit comprising a differential amplifier having transistors Q11, Q12, Q13 and Q14. The output signals produced at the two output terminals of the comparator circuit are applied to the AND gates G11 and G12, respectively.

The circuitry described above constitutes th light metering portion of the exposure control system.

The exposure control circuitry of this embodiment includes an AND gate circuit G14 which has its inputs connected to respective output terminals of flip-flops CA, CB, CC and CD and has its output connected to the base of a transistor Q22 through a fixed resistor R14. An electromagnet Mg is connected to the collector of the transistor Q22. The electromagnet is similar to that of the first embodiment and is designed such that when energized, it blocks the closing operation of the shutter and, when de-energized, it permits the shutter to initiate the closing operation.

Additional AND gate circuits G15, G16 and G17 have their inputs connected to the outputs of the flip-flops and have their outputs connected to shutter speed indicator lamps L1, L2 and L3, respectively. These lamps L1, L2 and L3 and their associated AND gates G15, G16 and G17, as well as a lamp L4 which is directly connected to an output terminal of flip-flop CD, operate in the manner shown in FIG. 3.

More particularly, when the count number stored in the reversible counter CU is 1, lamp L1 alone is ON as indicated by the symbol O, the other lamps being OFF as indicated by the symbols X. When the count number is 2 or 3, lamp L2 alone is ON; when the count number is 4, 5, 6, or 7, lamp L3 alone is ON: and when the count number is 8 or more, the lamp L4 alone is ON. In general terms, any given lamp Ln is ON whenever the count number is in the range of numbers from $2^{n-1}$ to $(2^n-1)$.

Power is supplied to the pulse generators PG1, PG2, the AND gate circuits G11, G12, G14, G15, G16, G17, the OR gate circuit G13 and the reversible counter CU by power source E.

Operation of the embodiment of FIG. 2 will now be described. The first and second differential amplifier circuits, the comparator circuit, pulse generators PG1 and PG2, AND gates G11, G12 and the reversible counter CU are similar in operation to corresponding circuits described with respect to the first embodiment, that is, the reversible counter CU counts in the positive or the negative direction until the input voltage $V_2'$ of the comparator circuit is made equal to input voltage $V_1'$.

The count number stored in the counter when the input voltages $V_1'$ and $V_2'$ are equal can be calculated by setting $V_1'$ equal to $V_2'$ in equations (5) and (6), which yields the following relationship:

$$K_6 \log \frac{BS}{A^2} + K_8 \log n = K_9 - K_7 \qquad (7).$$

If the circuit constants are determined so as to satisfy the relation that $K_6 = K_8$, there is given:

$$\log \frac{nBS}{A^2} = \frac{K_9 - K_7}{K_6},$$

or $$\frac{nBS}{A^2} = K_{10} \qquad (8),$$

where $$K_{10} = \exp \left( \frac{K_9 - K_7}{K_6} \right).$$

Thus, the count number n is inversely proportional to the object brightness B and the film sensitivity S and is directly proportional to the square of F-number of the lens. In other words, the count number is proportional to the exposure time required for proper exposure of the film.

Information relating to the count number $n$ is indicated by one of lamps L1, L2, L3 and L4 in the manner described above. Therefore, assuming that each pulse counted by the counter represents a required exposure time of 1 millisecond (this differs from the actual period of pulse generator PG1), then the turning on of lamp L1 represents a required exposure time of 1 millisecond; lamp L2, 2 milliseconds, lamp L3, 4 milliseconds, and lamp L4, 8 milliseconds. In this manner, the indication shifts from lamp to lamp each time the exposure time doubles.

When the shutter actuating button is depressed, switch S1 is opened by a mirror drive member or other means in the single-lens reflex camera, so that the pulse input from the pulse generator PG1 is cut off, thereby interrupting counting. The count number $n$ stored in counter CU is proportional to the exposure time required for an object having brightness measured to that point in time.

Shortly thereafter, when the shutter (not shown) opens, switch S2 is caused to close to permit pulses of predetermined frequency generated by pulse generator PG2 to be applied through OR gate G13 to input terminal B of reversible counter CU, causing counter CU to be stepped in the negative direction so that the count number decreases with time. When a number of pulses equal to the count number $n$ previously stored in the counter CU has been applied to terminal B of the counter, the count number becomes zero.

Prior to this time, the output of gate G14 has been at a low level L, causing transistor Q22 to conduct current for energizing electromagnet Mg for thereby preventing the shutter from closing. However, when the count number becomes zero, the output of AND gate circuit G14 assumes a high level H, which turns off transistor Q22 and cuts off the current supply to electromagnet Mg, thereby permitting the shutter to close.

In the embodiments of FIGS. 1 and 2, the comparator circuits comprise differential amplifier circuits having two output terminals. In the third embodiment of the invention, shown in FIG. 4, an inverter INV can be employed with a differential amplifier circuit having a single output terminal to provide a comparator circuit having two output terminals. It should be noted that the both G21 and G22 of the AND gate circuit can not be simultaneously open or closed, so that the pulse number counted by the reversible counter CU has an uncertainty of one pulse. The uncertainty, however, can be made negligible by appropriate circuit design. Transistor Q21, Q22, Q23, Q24 and Q25 provide a differential amplifier circuit for comparing the output of a photoelectric converter circuit (i.e., photoconductive element R21 and diode D21) with the output of a D-A converter circuit (i.e., diode D22 and resistors $R_A$, $R_B$, $R_C$ and $R_D$). The input of inverter INV is connected to the single output terminal of the differential amplifier circuit for producing a second output signal which is opposite in phase to the first output signal or difference signal produced at the output terminal of the differential amplifier circuit. The first and second output signals are applied to gates G21 and G22, respectively, for controlling counter CU substantially in the manner described above with respect to the first and second embodiments. Diode D23 and transistors Q26 – Q28 correspond to diode D3 and transistors Q5 – Q7, respectively, in the embodiment of FIG. 1 and are substantially similar in operation.

Figure 5:
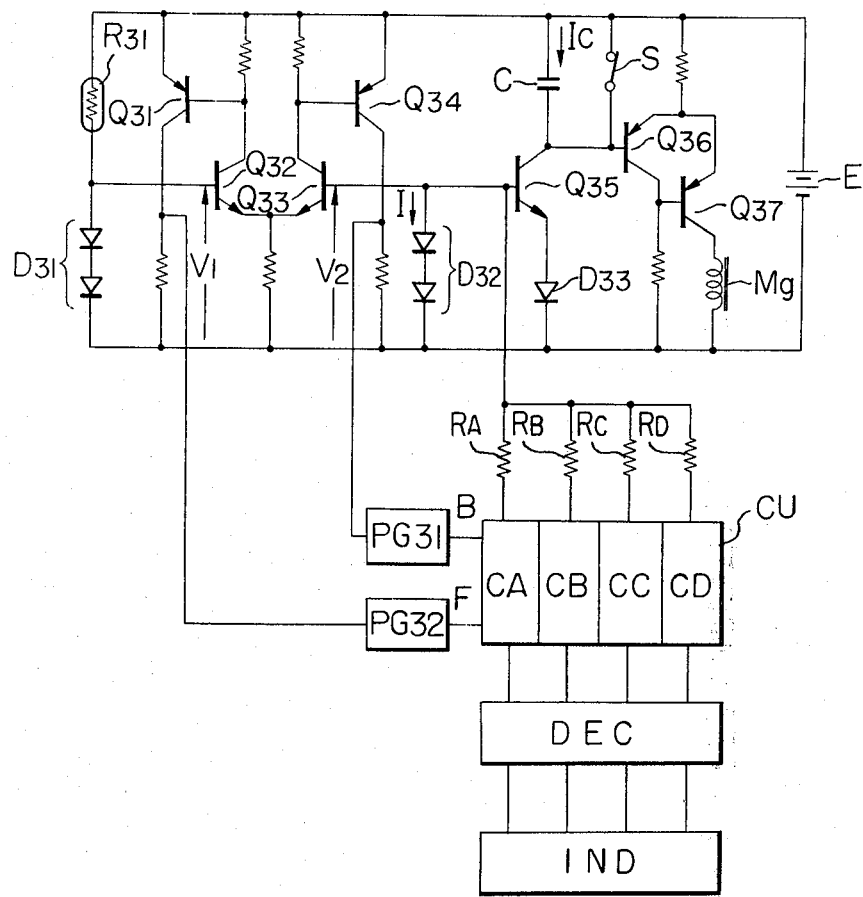

In a fourth embodiment, shown in FIG. 5, the two outputs of the comparator circuit control respective pulse generators. Transistors Q31, Q32, Q33 and Q34 provide a comparator circuit in the form of a differential amplifier for comparing the outputs of a photoelectric converter circuit (i.e., photoconductive element R31 and diode D31) and a D-A converter circuit (i.e., diode D32 and resistors $R_A$, $R_B$, $R_C$ and $R_D$). Pulse generators PG31 and PG 32 are of the conventional type which generate pulses in the presence of a particular control signal and have their control terminals connected to respective output terminals of the comparator circuit so that the pulse generators apply pulses to the reversible counter in the manner described with reference to the previous embodiments.

Figure 6:
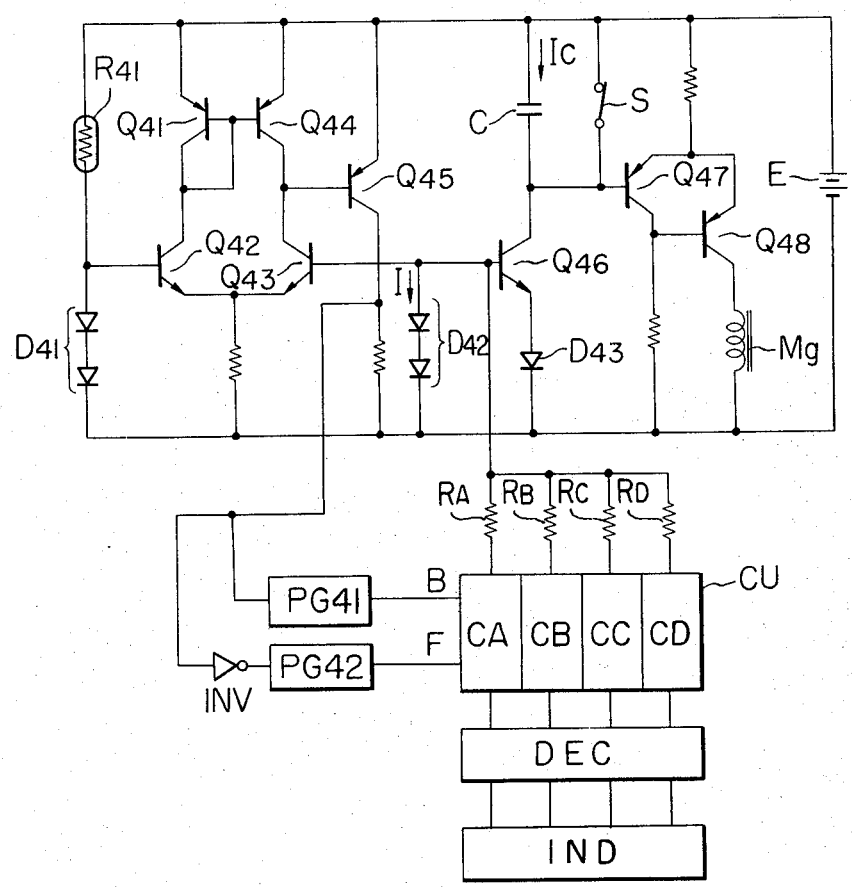

The comparator circuit of FIG. 5 comprises a differential amplifier having two output terminals connected to pulse generators PG31 and PG32, respectively. As shown in FIG. 6, the comparator circuit may comprise a differential amplifier having a single output terminal which is connected to the control terminal of a first pulse generator PG41 and to the input terminal of an inverter INV which has its output terminal connected to the control terminal of a second pulse generator PG42. It should be also noted that there is left the uncertainty of one pulse in the pulse number counter through the reversible counter CU, as shown in the embodiment of FIG. 4. The uncertainty can be made negligible, as indicated above. A photoelectric converter circuit comprising photoconductive element R41 and diode D41 provides one input signal for the differential amplifier circuit and a D-A converter circuit comprising resistors $R_A$, $R_B$, $R_C$ and $R_D$ and diode D43 provides the other input signal. Diode D43 and transistors Q46–Q48 correspond to diode D3 and transistors Q5–Q7, respectively of the embodiment of FIG. 1 and are substantially similar in operation.

Although the light metering systems of the invention have been described in conjunction with electric shutter control circuits for forming automatic shutter control systems for cameras, it will be understood that the metering systems of the invention may be employed as independent or associated exposure meters. For example, in the embodiment of FIG. 2, the parts related to shutter control (i.e., elements S1, PG2, S2, G13, G14, R14, Q22 and Mg) may be eliminated and the resistor R12 may be designed to be adjusted in accordance with various exposure factors, such as film speed and aperture setting, by some suitable means.

Furthermore, the metering systems of the invention may be employed with separate, known lens aperture control apparatus for providing fully automatic lens aperture control systems. Also, the invention enables the use of a photoelectromotive element, such as a photodiode, in lieu of the photoconductive element and enables the use of field effect transistors or silicon controlled elements in lieu of the transistors.

Moreover, although the embodiments described above employ 4-bit binary reversible counters, binary counters of greater bit capacity, decimal or other counters may be employed.

The light metering systems of the present invention provide the following advantages:

1. Light-emitting diodes, liquid crystals, electric lamps or other digital indicator elements may be employed for indicating exposure factors, thereby providing an exposure indicator which is smaller and simpler in construction than prior art indicators, and which is highly resistant to extraneous mechanical forces.

The input impedance of the comparator circuit (the circuit subsequent to the junction between R1 and D1) may be increased (for example, by using field effect transistors as the inputs of the comparator circuit) so that the degree of the accuracy of $V_1$ can be improved.

Referring to FIG. 1, in the present invention the gate circuits G1 and G2 are selectively opened by the comparator circuit for applying pulses to the counter CU until the count number stored therein is proportional to the object brightness. Consequently, a measurement error will occur unless the value of voltage $V_1$, which varies in proportion to the object brightness, is accurately detected.

The current $I_1$ flowing through the diode D1 and the voltage $V_1$ produced across the diode are in the relation:

$$V_1 = 2 \frac{kT}{q} \log \left(\frac{I_1}{I_s}\right),$$

where $k$ is Boltzmann's constant, T is absolute temperature, q is the quantity of electric charge, and $I_s$ is the reverse saturation current of the diode.

If the input impedance of the comparator circuit is low, the current through the base of transistor Q2 of the comparator circuit will be greater than the current through diode D1, so that voltage $V_1$ is lower than it would be if the junction of diode D1 and photoconductive element R1 were not connected to the input of the comparator circuit. Thus, if the input impedance of the comparator circuit is increased, the current flowing through diode D1 increases, and voltage $V_1$ increases.

3. Because the counter need not be reset periodically, it provides quicker response to the variations in the metering conditions, such as variations of object brightness, and may be simplified in construction.

4. The invention is readily applicable to systems for automatically controlling shutter speed or lens aperture. Furthermore, in the embodiments of these systems described hereinabove, there is provided a first analog signal inversely proportional to the object brightness and another analog signal proportional to the logarithm of the object brightness, which enables simplification of the construction of the shutter control system.

5. When employed with a TTL electric shutter, the present invention enables digital storage of the measured value of light, thus eliminating errors of the type caused by the leakage current or the like from a capacitor and enabling storage time of long duration.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A light metering system comprising:
   photoelectric means for producing a first analog signal which represents the intensity of light incident thereon;
   a reversible counter;
   converter means for producing a second analog signal which represents the count stored in said counter; and
   counter control means for stepping said counter in a first direction when the difference between the first and second analog signals is greater than a predetermined value and for stepping said counter in the opposite direction when said difference is less than said predetermined value.

2. A light metering system as set forth in claim 1, wherein said counter control means comprises comparator means for comparing said first and second analog signals, said comparator means producing a first output signal when said difference between the first and second analog signals is greater than said predetermined value and producing a second output signal when said difference is less than said predetermined value, and means for stepping said counter in said first direction in response to said first output signal and for stepping said counter in said opposite direction in response to said second output signal.

3. A light metering system as set forth in claim 2, wherein said reversible counter comprises a pulse counter having first and second input terminals to which pulses may be applied for stepping the counter in said first and opposite directions, respectively, and wherein the last-mentioned means comprises means for applying pulses to one of said first and second input terminals in response to said first output signal and for applying said pulses to the other of said input terminals in response to said second output signal.

4. A light metering system as set forth in claim 3, wherein said means for applying pulses comprises a pulse generator for generating said pulses and first and second gate means responsive to said first and second output signals, respectively, for applying said pulses to said one and said other input terminals, respectively, of said pulse counter.

5. A light metering system as set forth in claim 3, wherein said means for applying pulses comprises first and second pulse generators responsive to said first and second output signals, respectively, for applying pulses to said one and said other input terminals, respectively, of said pulse counter.

6. A light metering system as set forth in claim 3, wherein said comparator means comprises a differential amplifier having first and second output terminals for providing said first and second output signals, respectively.

7. A light metering system as set forth in claim 3, wherein said comparator means comprises a differential amplifier having an output terminal for providing said first output signal of the comparator means and an inverter having its input connected to said output terminal so that the output of said inverter provides said second output signal of the comparator means.

8. A light metering system as set forth in claim 1, wherein said converter means comprises a plurality of weighted resistors corresponding to respective counting stages of said counter, each of said resistors being adapted to conduct current in response to a particular condition of its corresponding counting stage.

9. A light metering system in accordance with claim 1, further comprising a plurality of digital display elements and means for actuating the display elements in accordance with the count in said counter.

10. An automatic exposure control system comprising:
    photoelectric means for producing a first analog signal which represents the brightness of an object to be photographed;
    a reversible counter;
    converter means for producing a second analog signal which represents the count in said counter;
    counter control means for stepping said counter in a first direction when the difference between the first and second analog signals is greater than a predetermined value and for stepping said counter in the opposite direction when the difference between the analog signals is less than said predetermined value; and
    exposure control means for controlling exposure of film in a camera in accordance with the count in said counter.

11. An exposure control system as set forth in claim 10, wherein said counter control means comprises comparator means for comparing said first and second analog signals, said comparator means producing a first control signal when the difference between the first and second analog signals is greater than said predetermined value and producing a second control signal when said difference is less than said predetermined value and means for stepping said counter in said first direction in response to said first control signal and for stepping said counter in said opposite direction in response to said second control signal.

12. An exposure control system as set forth in claim 11, wherein said reversible counter comprises a pulse counter having first and second input terminals to which pulses may be applied for stepping the counter in said first and opposite directions, respectively, and wherein the last-mentioned means comprises means for applying pulses to one of said first and second input terminals in response to said first output signal and for applying said pulses to the other of said input terminals o in response to said second output signal.

13. An exposure control system as set forth in claim 12, wherein said means for applying pulses comprises a pulse generator for generating said pulses and first and second gate means responsive to said first and second output signals, respectively, for applying said pulses to said one and said other input terminals, respectively, of the pulse counter.

14. An exposure control system as set forth in claim 11, wherein said means for applying pulses comprises first and second pulse generators responsive to said first and second output signals, respectively, for applying said pulses to said one and said other input terminals, respectively, of said counter.

15. An exposure control system as set forth in claim 12, wherein said comparator means comprises a differential amplifier having first and second output terminals for providing said first and second output signals, respectively.

16. An exposure control system as set forth in claim 12, wherein said comparator means comprises a differential amplifier having an output terminal for providing said first output signal of the comparator means and an inverter having its input connected to said first output terminal so that the output of said inverter provides said second output signal of the comparator means.

17. An exposure control system as set forth in claim 11, wherein said converter means comprises a plurality of weighted resistors corresponding to respective counting stages of said pulse counter, each of said resistors being adapted to conduct current in response to a particular condition of its corresponding counting stage.

18. An exposure control system in accordance with claim 10, further comprising a plurality of digital display elements and means for actuating the display elements in accordance with the count in said counter.

19. An exposure control system as set forth in claim 10, wherein said exposure control means comprises shutter control means for controlling the exposure time of the camera.

20. An exposure control system as set forth in claim 19, wherein said shutter control means comprises means for interrupting stepping of said counter by said counter control means in response to actuation of the shutter opening mechanism of the camera, means for stepping the counter in one of said first and opposite directions after said interruption, and means for preventing the shutter from closing until said counter has been stepped thereby to a predetermined count.

21. An exposure control system as set forth in claim 20, wherein said counter comprises a pulse counter, and wherein said means for stepping said pulse counter after said interruption comprises a pulse generator and a switch responsive to opening of the shutter for applying pulses generated by said pulse generator to said counter, and wherein said means for preventing the shutter from closing comprises an electromagnet for holding the shutter open when the electromagnet is energized and gate means for energizing the electromagnet until said pulse counter reaches said predetermined count.

22. A light metering system as set forth in claim 19, wherein said shutter control means comprises:
    means for producing a current proportional to the intensity of light incident on said photoelectric means;
    a capacitor;
    switch means for initiating charging of said capacitor by said current in response to actuation of the shutter opening mechanism of the camera; and
    means for preventing the shutter from closing until the voltage on said capacitor reaches a predetermined voltage.

23. A light metering system as set forth in claim 22, wherein the last-mentioned means comprises an electromagnet for holding the shutter in open position when the electromagnet is energized, and detector means for de-energizing said electromagnet when the voltage across said capacitor reaches said predetermined value.

* * * * *